United States Patent [19]
Goda

[11] Patent Number: 4,912,693
[45] Date of Patent: Mar. 27, 1990

[54] OPTICAL HEAD DEVICES FOR USE IN DISC PLAYERS

[75] Inventor: Yoshimasa Goda, Kanagawa, Japan

[73] Assignee: Sony Corporation, Tokyo, Japan

[21] Appl. No.: 363,293

[22] Filed: Jun. 7, 1989

Related U.S. Application Data

[63] Continuation of Ser. No. 25,176, Mar. 12, 1987, abandoned.

[30] Foreign Application Priority Data

Mar. 15, 1986 [JP] Japan ............................ 61-057426

[51] Int. Cl.⁴ .............................................. G11B 7/00
[52] U.S. Cl. ..................................... 369/44; 369/122; 369/111; 350/255
[58] Field of Search ..................... 369/44–46, 369/111, 122; 350/255

[56] References Cited

U.S. PATENT DOCUMENTS

| | | | |
|---|---|---|---|
| 4,437,177 | 3/1984 | Watabe et al. | 369/44 X |
| 4,571,715 | 2/1986 | Kato et al. | 369/45 |
| 4,727,529 | 2/1988 | Arahi et al. | 369/44 |
| 4,737,946 | 4/1988 | Yamashita et al. | 369/45 |
| 4,751,694 | 6/1988 | Naito et al. | 369/45 X |

OTHER PUBLICATIONS

JP article: vol. 58; No. 11, 1984, pp. 4–7.

Primary Examiner—Aristotelis M. Psitos
Attorney, Agent, or Firm—Hill, Van Santen, Steadman & Simpson

[57] ABSTRACT

An optical head device for use in a disc player has a light beam generating and detecting unit for generating a light beam emerging therefrom and detecting a light beam coming thereto from the outside, an object lens driving unit for supporting an object lens and moving the same in both a first direction along an optical axis of the object lens and a second direction substantially perpendicular to the first direction, and a movable base member for supporting the light beam generating and detecting unit and the object lens driving unit both mounted thereon so that the light beam emerging from the light beam generating and detecting unit is incident through a predetermined path upon the object lens supported by the object lens driving unit. In an embodiment, the movable base member is formed into the shape of a plate, and the light beam generating and detecting unit and the object lens driving unit are mounted respectively on opposite surfaces of the movable base member.

9 Claims, 6 Drawing Sheets

OPTICAL HEAD DEVICES FOR USE IN DISC PLAYERS

This is a continuation of application Ser. No. 025,176, filed Mar. 12, 1987, now abandoned.

BACKGROUND OF THE INVENTION

1. Field of the invention

The present invention relates generally to optical head devices for use in disc players, and more particularly, to an optical head device for generating and controlling a light beam incident upon an optical record disc loaded on a disc player and for detecting the light beam emerging from the optical record disc.

2. Description of the Prior Art

Figure 1:
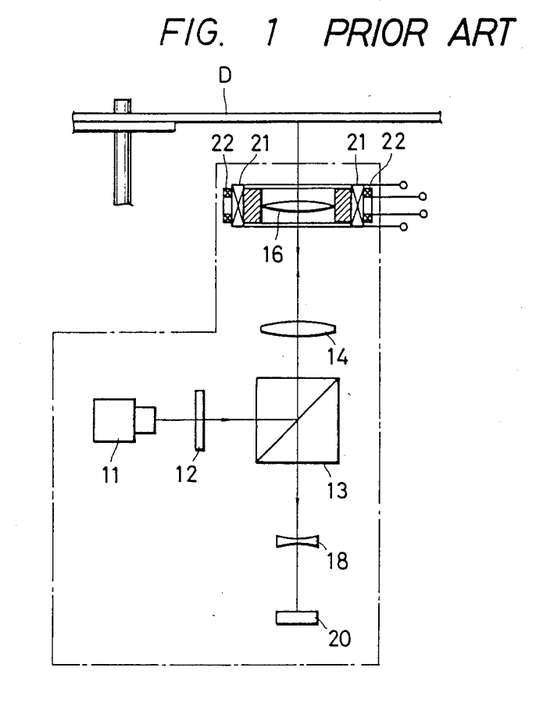
FIG. 1 is a schematic illustration showing an example of a previously proposed optical head device.

In an optical disc player for reproducing information recorded on an optical record disc, an optical head device is provided for constituting an optical arrangement to read information from a record track formed on the optical record disc loaded on the optical disc player. An example of such an optical head device proposed previously is arranged as schematically shown in FIG. 1.

This optical head device is formed into a unit containing a semiconductor laser element 11, a photodetector 20 and other optical parts and movable in the direction of the radius of a record disc D. In the unit, a laser light beam generated by the semiconductor laser element 11 is diffracted by a diffraction grating 12 to be divided into three beams, which are represented with a single solid line in FIG. 1 for the sake of simplification, and each of the three laser light beams is subjected to a change of direction of the axis thereof by a beam splitter 13 to enter into a collimator lens 14. The laser light beam collimated by the collimator lens 14 is caused to impinge upon the record disc D through an object lens 16 and reflected from the record disc D after being subjected to modulations at a record track formed on the record disc D.

The reflected laser light beam emerging from the record disc D returns through the object lens 16 and the collimator lens 14 to passing through the beam splitter 13 without a further change of direction of the axis thereof and then is guided through a light receiving lens 18 to the photodetector 20. Then, detection output signals obtained from the photodetector 20 are supplied to a signal processing circuit (not shown in FIG. 1) to produce, for example, a reproduced information signal, a focus control signal and a tracking control signal.

The focus and tracking control signals obtained from the signal processing circuit are supplied respectively to a focus control driver 21 and a tracking control driver 22 both provided in relation to the object lens 16. The focus control driver 21 is operative to move the object lens 16 in a direction along the optical axis thereof to approach or recede from the record disc D in response to the focus control signal supplied thereto, and the tracking control driver 22 is operative to move the object less 16 so as to shift the laser light beams incident upon the record disc D in a direction transverse to the record track in response to the tracking control signal supplied thereto.

The optical head device constituted as described above is provided with its overall shape and dimension, the size of each portion thereof and so on in accordance with the shape, size, function and so forth of a disc player to which the optical head device is applied. That is, generally, an optical head device is designed and produced to be dedicated to each type of disc player and therefore, for example, an optical head device for use in a disc player used on a table is different in shape, size and weight from an optical head device for use in a portable disc player. Therefore, for supplying optical head devices for use in various types of disc players, it is required to design and produce a plurality of different types of optical head devices each dedicated to each of the disc players. This results in that a relatively long term and a relatively large amount of expence are spent and various facilities are required for designing and producing the optical head devices, so that the production co t of the optical head device is increased.

OBJECTS AND SUMMARY OF THE INVENTION

Accordingly, it is an object of the present invention to provide an optical head device for use in a disc player which avoids the aforementioned problems encountered with the prior art.

Another object of the present invention is to provide an optical head device for use in a disc player which can be applied selectively to various different types of disc players by means of varying an arrangement of principal components thereof without having substantial changes in each of the principal components.

A further object of the present invention is to provide an optical head device for use in a disc player which can be applied selectively to a plurality of disc players different in shape, size, function and so on from one another by means of varying an arrangement of principal components thereof or in addition providing some minor revisions accompanying with the variation of the arrangement of principal components thereof without having substantial changes in each of the principal components.

A still further object of the present invention is to provide an optical head device for use in a disc player which can be applied selectively to various different types of disc players without having substantial changes in each principal component thereof and can be obtained at a reduced cost of production.

According to the present invention, there is provided an optical head device for use in a disc player comprising a light beam generating and detecting unit containing a light beam generator, a collimator lens, a photodetector, and a beam splitter for leading a light beam generated by the light beam generator to the collimator lens and guiding a light beam coming through the collimator lens from the outside onto the photodetector; an object lens driving unit for supporting an object lens to be movable and moving the same in both a first direction along an optical axis of the object lens and a second direction substantially perpendicular to the first direction; and a movable base member for supporting the light beam generating and detecting unit and the object lens driving unit both mounted thereon so that the light beam emerging from the collimator lens contained in the light beam generating and detecting unit is incident through a predetermined path upon the object lens supported by the object lens driving unit.

The optical head device thus constituted with the light beam generating and detecting unit and the object lens driving unit mounted as two principal components on the movable base member in accordance with the present invention, can be formed selectively into various different figures by means of changing a manner of mounting of the light beam generating and detecting unit and the object lens driving unit on the movable base member or in addition providing some minor revisions accompanying with the change of that manner of mounting. Therefore, the optical head device according to the present invention is applicable selectively to a plurality of disc players different in shape, size, function and so forth from one another without having substantial variations in each of the light beam generating and detecting unit and the object lens driving unit, so as to be supplied selectively for various different types of disc players at a reduced cost of production. Consequently, in the case where the optical head device according to the present invention is applied to be used as each of optical head devices for use in various types of disc players, a plurality of different types of optical head device each dedicated to each of the disc players are easily designed and produced in a relatively short term and with a relatively small amount of expense, so that the production cost of the optical head device is decreased.

The above, and other objects, features and advantages of the present invention will become apparent from the following detailed description which is to be read in conjunction with the accompanying drawings.

DESCRIPTION OF THE PREFERRED EMBODIMENTS

Figure 2:
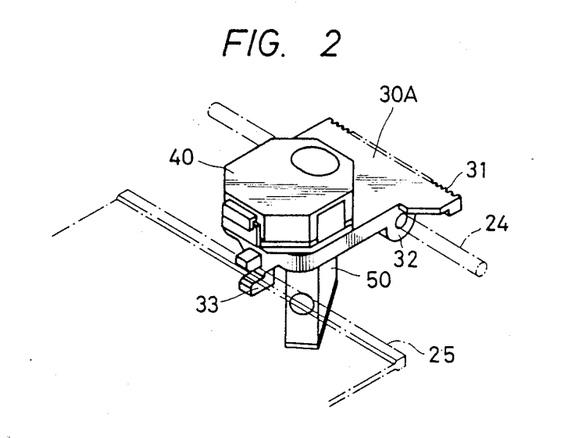
FIG. 2 is a schematic perspective view showing an embodiment of optical head device for use in a disc player according to the present invention.

FIG. 2 shows one embodiment of optical head device for use in a disc player according to the present invention.

Referring to FIG. 2, the embodiment comprises a movable base member 30A, an object lens driving unit 40 mounted on the upper surface of the movable base member 30A for facing a record disc, and a light beam generating and detecting unit 50 mounted on the under surface of the movable base member 30A. On the occasion of actual use, this embodiment in its entirety is engaged with guide members 24 ad 25 to be movable under the guidance by the guide members 24 add 25 in a direction along the radius of the record disc and driven by a rack and pinion mechanism. The movable base member 30A is provided with a first slider 32 through which the guide member 24 is inserted, a second slider 33 which engages with the guide member 25, and a rack portion 31 for engaging with a pinion of a driving mechanism provided in a disc player in which the embodiment is employed.

Figure 3:
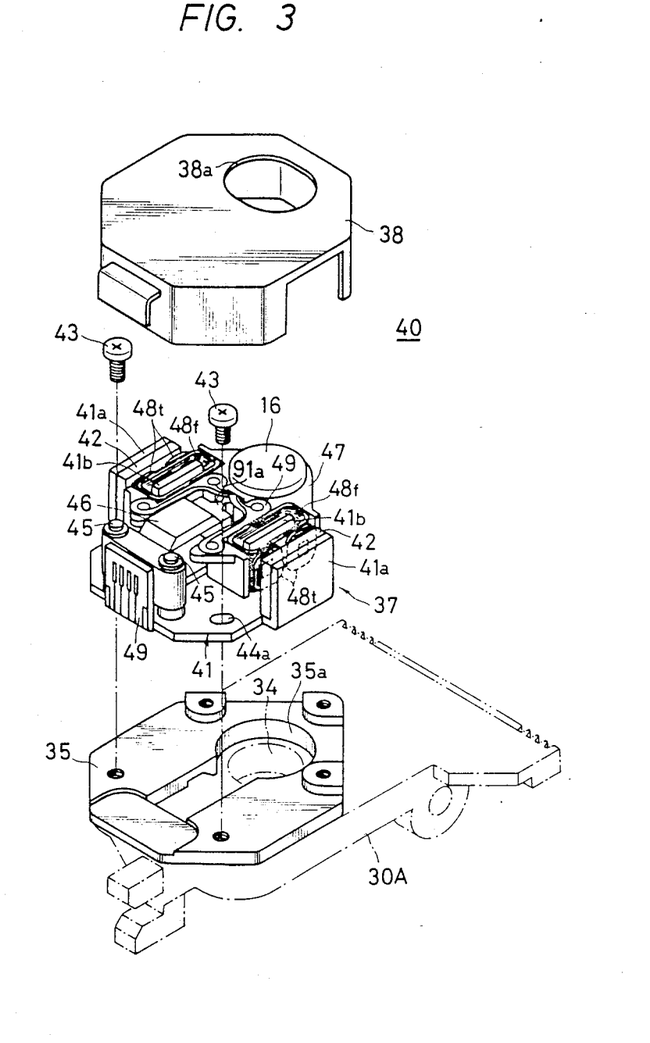
FIG. 3 is an exploded perspective view showing an example of an object lens driving unit employed in the embodiment shown in FIG. 2.

The object lens driving unit 40 comprises, as shown in FIG. 3, a base plate member 35 made of, for example, die-cast zinc alloy to have an opening 35a at the central portion thereof and mounted on the movable base member 30A so as to position the opening 35a to correspond to an opening 34 formed on the movable base member 30A, a biaxial driver 37 which is operative to perform a driving operation for focus servocontrol to move an object lens in a direction along the optical axis thereof so as to approach or recede from the record disc and a driving operation for tracking servocontrol to move the object lens in a direction substantially perpendicular to the optical axis thereof and along the radius of the record disc, and a case 38 having an opening 38a and provided for covering the biaxial driver 37 on the base plate member 35.

Figure 4:
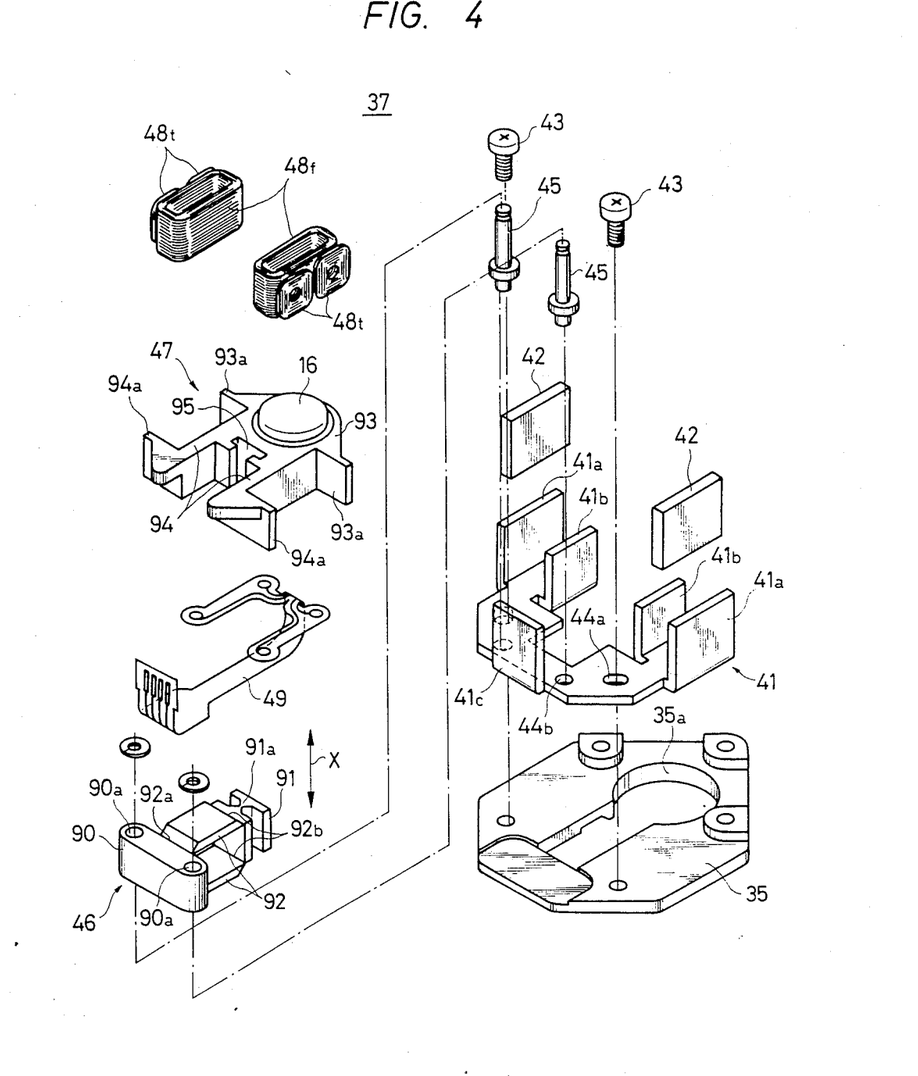
FIG. 4 is an exploded perspective view showing an example of a biaxial driver used in the object lens driving unit shown in FIG. 3.

As shown in FIGS. 3 and 4, the biaxial driver 37 has a magnetic yoke member 41 which is formed by processing magnetic plate material and is fixed on the base plate member 35 by a couple of screws 43. The magnetic yoke member 41 is provided with two pairs of standing projections 41a and 41b facing each other and a standing support 41c, and a plate magnet 42 is attached to each of the standing projections 41a.

On the magnetic yoke member 41, a couple of elongated opening 44a are provided to permit the screws 43 to pass therethrough, respectively, so that the magnetic yoke member 41 can be finely adjusted in its position on the base plate member 35 when it is fixed on the base plate member 35 by the screws 43. A couple of openings 44b are also provided in the vicinity of the elongated opening 44a on the magnetic yoke member 41 and a couple of pins 45 project upwards from the base plate member 35 through the openings 44b to the upper side of the magnetic yoke member 41 to support a movable member 46 disposed on the magnetic yoke member 41.

The movable member 46 comprises a stationary portion 90 which has a couple of holes 90a through which the pin 45 are inserted, respectively, and a bottom surface which comes into contact with flanges of the pins 45, a pair of parallel arm portions 92 which are connected, at one ends thereof, through hinge portions 92a with the upper and under portions of the stationary portion 90, respectively, to be swingable in a direction substantially perpendicular to the guide member 24 shown in FIG. 2 (hereinafter, referred to as an X direction), and an end plate portion 91 which is connected, at its upper and under ends, through hinge portions 92b with the other ends of the arm portions 92 and provided with a hinge portion 91a making a half of the end plate portion 91 swingable in a direction perpendicular to the X direction. The end plate portion 91 is engaged with a cutout 95 provided on a bobbin member 47 which holds an object lens 16.

The bobbin member 47 has a lens holding portion 93 to which the object lens 16 is attached and a pair of side plate portions 94 which extend from the lens holding portion 93 and provided therebetween a space in which the arm portions 92 of the movable member 46 are loosely inserted when the end plate portion 91 of the movable member 46 is engaged with the cutout 95. Two pairs of plate projections 93a and 94a are formed on the lens holding portion 93 and each of the side plate portions 94, respectively, and between each pair of plate projections 93a and 94a, a focus control coil 48f wound to be shaped into a tube and a tracking control coil 48t attached to the surface of the focus control coil 48f so as to have an axis for winding thereof substantially perpendicular to the axis for winding of the focus control coil 48f are disposed. The movable member 46 with which the bobbin member 47 is engaged is mounted on the magnetic yoke member 41 through the pins 45 in such a manner that each of the focus control coil 48f to which the tracking control coil 48t is attached is put on each of the standing projections 41b provided on the magnetic yoke member 41.

On the upper surfaces of the side plate portions 94 of the bobbin member 47, one end portion of a flexible connecting sheet 49 which comprises a film of polyimide resin and line conductors printed on the film is attached for connecting both the focus control coil 48f and the tracking control coil 48t to focus control signal supplying portion and a tracking control signal supplying portion, respectively. The other end portion of the flexible connecting sheet 49 is led through the coutout 95 provided on the bobbin member 47 to be under the bobbin member 47 and fixed to the standing support 41c provided on the magnetic yoke member 41.

When the biaxial driver 37 thus constituted performs the driving operations for focus servocontrol, the focus control signal is supplied from the focus control signal supplying portion through the flexible connecting sheet 49 to each of the focus control coils 48f. Then, the focus control coils 48f receive electromagnetic force varying in response to the polarity and level of the focus control signal in magnetic fields each generated by a magnetic field forming portion composed of the standing projections 41a and 41b on the magnetic yoke member 41 and the plate magnet 42 fixed on the standing projection 41a, so as to be moved in the X direction. Accordingly, the bobbin member 47 to which the focus control coils 48f are fixed is shifted in the X direction together with the arm portions 92 of the movable member 46, and as a result, the object lens 16 held by the bobbin member 47 is moved in the X direction in response to the focusing control signal.

Further, when the biaxial driver 37 performs the driving operations for tracking servocontrol, the tracking control signal is supplied from the tracking control signal supplying portion through the flexible connecting sheet 49 to each of the tracking control coils 48t. Then, the tracking control coils 48t receive electromagnetic force varying in response to the polarity and level of the tracking control signal in the magnetic fields each generated by the magnetic field forming portion composed on the standing projections 41a and 41b on the magnetic yoke member 41 and the plate magnet 42 fixed on the standing projection 41a, so that one of the tracking control coils 48t is moved to approach the plate magnet 42 and the other of the tracking control coils 48t is moved to recede from the plate magnet 42. Accordingly, the bobbin member 47 to which the tracking control coils 48t are attached through the focus control coils 48f, respectively, is moved to rotate on an axis formed at the hinge portion 91a of the movable member 46, and as a result, the object lens 16 held by the bobbin member 47 is moved in a direction substantially perpendicular to the axis thereof and along the guide member 24 shown in FIG. 2 in response to the tracking control signal.

Each of the openings 34 and 35a provided on the movable base member 30A and the base plate member 35, respectively, permits a laser light beam as described later to pass through the movable base member 30A and the base plate member 35 to be incident upon the object lens 16, and the opening 38a provided on the case 38 permits the laser light beam coming from the object lens 16 to pass through the case 38 to the outside of the same.

Figure 5:
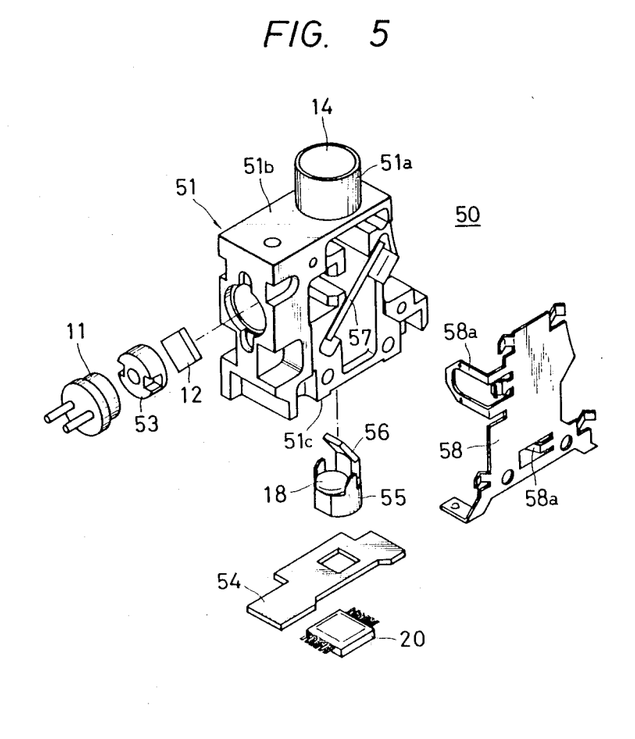
FIG. 5 is an exploded perspective view showing an example of a light beam generating and detecting unit employed in the embodiment shown in FIG. 2.

As shown in FIG. 5, the light beam generating and detecting unit 50 has a mount-housing 51. This mount-housing 51 is provided with a cylindrical portion 51a on its end surface 51b and mounted as shown in FIG. 2 on the under surface of the movable base member 30A in such a manner that the end surface 51b faces the under surface of the movable base member 30A and the cylindrical portion 51a is inserted in the opening 34 provided on the movable base member 30A. collimator lens 14 is fixed at the inside of the cylindrical portion 51a.

In the mount-housing 51, a semiconductor laser element 11 and a diffraction grating 12 accompanied with a holder 53 are disposed to align with a first common optical axis, and a photodetector 20 mounted on a mounting plate 54 which is fixed to an end surface 51c opposite to the end surface 51b, and a light receiving lens 18 and a compensating glass plate 56 both supported by a holder 55 are also disposed to align with a second common optical axis perpendicular to the first common optical axis. Further, a beam splitter 57 shaped into a plate is disposed at the position where the first and second common optical axes crosses each other in the mount-housing 51.

In addition, a mounting opening provided at one of side portions of the mount-housing 51 is covered by a cover 58 which has a plurality of engaging portions 58a each projecting into the inside of the mount-housing 51 for positioning some optical elements or parts contained in the mount-housing 51.

Figure 6:
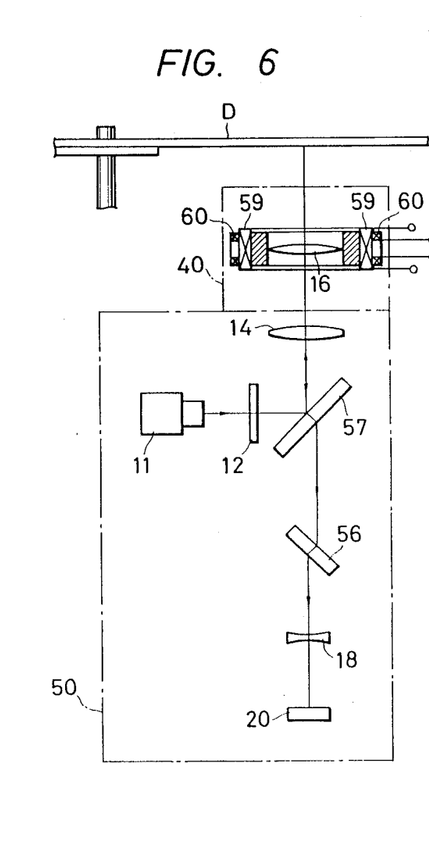
FIG. 6 is a schematic illustration showing an arrangement of various optical parts and elements in the embodiment shown in FIG. 2.

FIG. 6 shows schematically the arrangement of the above mentioned optical elements or parts in the embodiment shown in FIG. 2. Referring to FIG. 6, a laser light beam generated by the semiconductor laser element 11 is diffracted by the diffraction grating 12 to be divided into three beams, which are represented with a single solid line in FIG. 6 for the sake of simplification, and each of the three laser light beams is reflected at the beam splitter 57 to enter into the collimator lens 14. The laser light beam collimated by the collimator lens 14 is caused to impinge upon a record disc D through the object lens 16 and reflected from the record disc D after being subjected to modulations at a record track formed on the record disc D. A focus control driver 59 comprising the focus control coils 48f and the magnetic field forming portions and a tracking control driver 60 comprising the tracking control coils 48t and the magnetic field forming portions are provided in relation to the object lens 16.

The reflected laser light beam emerging from the record disc D returns through the object lens 16 and the collimator lens 14 to pass through the beam splitter 57. Then, the reflected laser light beam passes through the compensating glass plate 56 and thereby coma-aberration caused on the reflected laser light beam by the beam splitter 57 is compensated. After that, the reflected laser light beam is guided through the light receiving lens 18 to the photodetector 20 which produces detection output signals in response to the reflected laser light beam received thereby. The detection output signals obtained from the photodetector 20 are supplied to a signal processing circuit (not shown in FIG. 6) to produce, for example, a reproduced information signal, a focus error signal and a tracking error signal.

The focus error signal is supplied to the focus control signal supplying portion to generate the focus control signal which is supplied to the focus control coils 48f in the focus control driver 59 and the tracking error signal is supplied to the tracking control signal supplying portion to generate the tracking control signal which is supplied to the tracking control coils 48t in the tracking control driver 60.

In this arrangement, the semiconductor laser element 11, diffraction grating 12, beam splitter 13, collimator lens 14, compensating glass plate 56, light receiving lens 18 and photodetector 20 are put together to form the light beam generating and detecting unit 50, and the object lens 16, focus control driver 59 and tracking control driver 60 are also put together to form the object lens driving unit 40.

Figure 7:
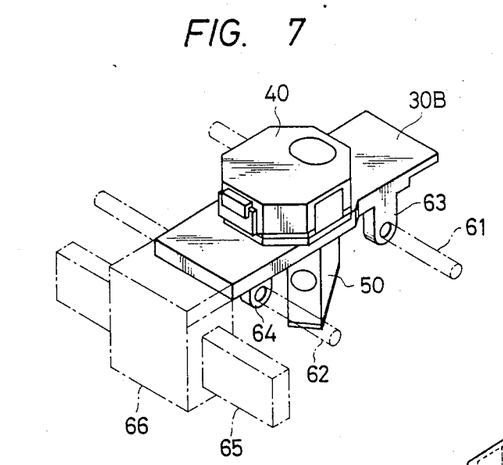
FIG. 7 is a schematic perspective view showing another embodiment of optical head device for use in a disc player according to the present invention.

FIG. 7 shows another embodiment of optical head device for use in a disc player according to the present invention.

The embodiment shown in FIG. 7 comprises such object lens driving unit 40 and light beam generating and detecting unit 50 as described above with reference to FIGS. 2 to 5 and a movable base member 30B which is taken in place of the movable base member 30A shown in FIGS. 2 and 3. The object lens driving unit 40 is mounted on the upper surface of the movable base member 30B and the light beam generating and detecting unit 50 is mounted on the under surface of the movable base member 30B.

On the occasion of actual use, this embodiment in its entirety is engaged with guide members 61 and 62 to be movable under the guidance by the guide members 61 and 62 in the direction along the radius of the record disc and driven by a linear motor 65. The movable base member 30B is provided with a first slider 63 through which the guide member 61 is inserted, a second slider 64 which engages with the guide member 62, and a moving block 66 driven by the linear motor 65.

As apparent from the above description of the embodiments shown in FIGS. 2 and 6, the optical head device according to the present invention can be applied selectively to a plurality of disc players having different driving mechanisms for moving optical head devices in a direction along the radius of a record disc by means of changing only tee movable base member without having substantial variations in each of the light beam generating and detecting unit and the object lens driving unit.

Figure 8:
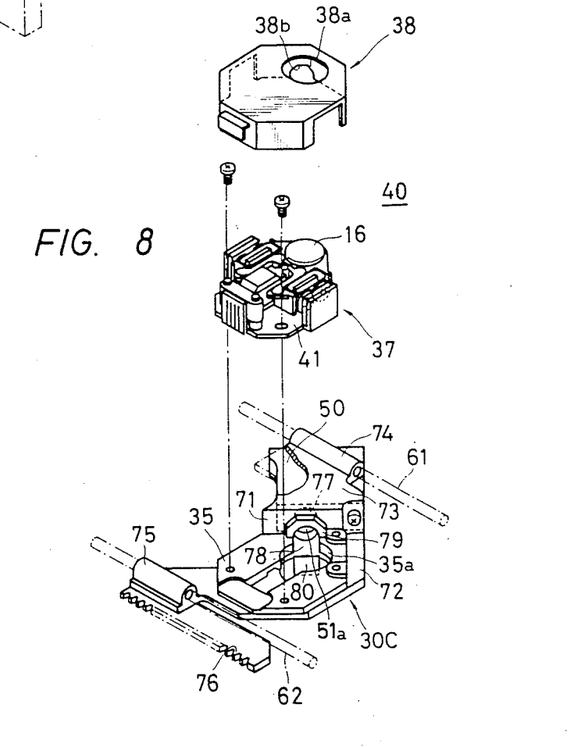
FIG. 8 is an exploded perspective view showing a further embodiment of optical head device for use in a disc player according to the present invention.

FIG. 8 shows a further embodiment of optical head device for use in a disc player according to the present invention. In FIG. 8, parts and elements corresponding to those of FIGS. 2, 3 and 7 are designated by the same references and further description thereof will be omitted.

The embodiment shown in FIG. 8 is suitable for use in a portable disc player and comprises a movable base member 30C which has first and second mounting stages 72 and 73 separated by a step portion 71 therebetween, an object lens driving unit 40 mounted on the upper surface of the first mounting stages 72 of the movable base member 30C, and a light beam generating and detecting unit 50 mounted on the under surface of the second mounting stage 73 of the movable base member 30C to be laid on its side and positioned laterally to the object lens driving unit 40, so that the overall thickness is made relatively small.

On the occasion of actual use, this embodiment in its entirety is engaged with guide members 61 and 62 to be movable under the guidance by the guide members 61 and 62 in the direction along the radius of the record disc and driven by a rack and pinion mechanism. The movable base member 30C is provided with a first slider 74 through which the guide member 61 is inserted, a second slider 75 which engages with the guide member 62, and a rack portion 76 for engaging with a pinion of a driving mechanism provided in a disc player in which the embodiment is employed.

The step portion 71 of the movable base member 30C is provided with an opening 77 in which a cylindrical portion 51a projecting from a mount-housing of the light beam generating and detecting unit 50 is inserted. Further, a base plate member 35 of the object lens driving unit 40 is provided with a cutout 78 and an arch 79 over the cutout 78, and a case 38 of the object lens driving unit 40 is provided in addition to an opening 38a with a cutout 38b at a portion thereof corresponding to the arch 79 provided on the base plate member 35.

At a portion of the first mounting stage 72 of the movable base member 30C directly below an object lens 16 supported by the object lens driving unit 40, a mirror 80 is disposed for reflecting a laser light beam emerging from the cylindrical portion 51a provided on the mount-housing of the light beam generating and detecting unit 50 to guide the same toward the object lens 16.

Figure 9:
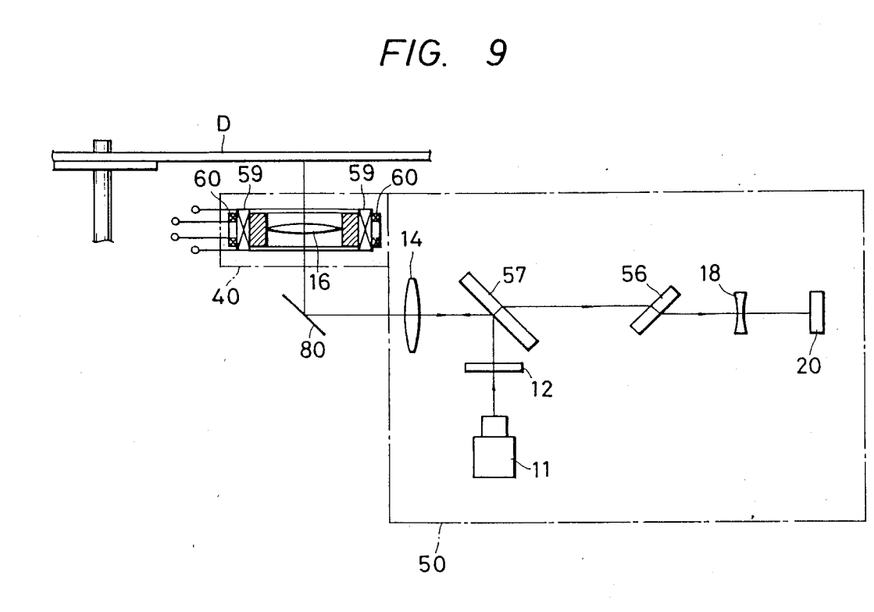
FIG. 9 is a schematic illustration showing an arrangement of various optical parts and elements in the embodiment shown in FIG. 8.

FIG. 9 shows schematically the arrangement of the optical elements or parts in the embodiment shown in FIG. 8. Referring to FIG. 9, the laser light beam generated by a semiconductor laser element 11 is diffracted by a diffraction grating 12 to be divided into three beams, which are represented with a single solid line also in FIG. 9 for the sake of simplification, and each of the three laser light beams is reflected at a beam splitter 57 to enter into a collimator lens 14. The laser light beam collimated by the collimator lens 14 advances along a path substantially parallel with the surface of a record disc D to enter into the mirror 80 and is reflected at the mirror 80 toward the object lens 16. Then, the laser light beam reflected from the mirror 80 is caused to impinge upon the record disc D through the object lens 16 and reflected from the record disc D after being subjected to modulations at a record track formed on the record disc D. A focus control driver 59 comprising focus control coils 48f and magnetic field forming portions and a tracking control driver 60 comprising tracking control coils 48t and the magnetic field forming portions are provided in relation to the object lens 16.

The reflected laser light beam emerging from the record disc D returns through the object lens 16 to enter into the mirror 80 and is reflected at the mirror 80 toward the collimator lens 14 along the path substantially parallel with the surface of the record disc D. Then, the reflected laser light beam passes through the collimator lens 14, the beam splitter 57 and a compensating glass plate 56 successively. When the reflected laser light beam passes through the compensating glass plate 56, coma-aberration caused on the refelected laser light beam by the beam splitter 57 is compensated. After that, the reflected laser light beam is guided through a light receiving lens 18 to a photodetector 20 which produces detection output signals in response to the reflected laser light beam received thereby. The detection output signals obtained from the photodetector 20 are supplied to a signal processing circuit (not shown in FIG. 9) to produce, for example, a reproduced information signal, a focus error signal and a tracking error signal. The focus error signal is supplied to a focus control signal supplying portion to generate a focus control signal which is supplied to the focus control coils 48f in the focus control driver 59 and the tracking error signal is supplied to a tracking control signal supplying portion to generate a tracking control signal which is supplied to the tracking control coils 48t in the tracking control driver 60.

In this arrangement, the semiconductor laser element 11, diffraction grating 12, beam splitter 57, collimator lens 14, compensating glass plate 56, light receiving lens 18 and photodetector 20 are put together to form the light beam generating and detecting unit 50, and the object lens 16, focus control driver 59 and tracking control driver 60 are also put together to form the object lens driving unit 40 in the same manner as the embodiment shown in FIG. 2, and in addition the mirror 80 is provided.

As apparent from the above description of the embodiment shown in FIG. 8, the optical head device according to the present invention can be applied to the portable disc player having a relatively small overall thickness by means of changing the movable base member and in addition providing some minor revisions to the object lens driving means, in comparison with the embodiment of FIG. 2.

What is claimed is:

1. An optical head device for use in a disc player comprising:
   a light beam generating and detecting unit containing light beam generating means, collimating lens means, photodetecting means and beam splitting means, said beam splitting means leading a light beam generated by said light beam generating means to said collimating lens means and guiding a light beam coming through said collimating lens means from the outside onto said photodetecting means,
   an object lens driving unit for supporting object lens means to be movable and moving said object lens means in both a first direction along an optical axis of said object lens means and a second direction substantially perpendicular to said first direction; and
   a movable base member for supporting said light beam generating and detecting unit and said object lens driving unit both mounted thereon so that the light beam emerging from said collimating lens means contained in said light beam generating and detecting unit is incident through a predetermined path upon the object lens supported by said object lens driving unit, and
   wherein said movable base member is formed into the shape of a plate, and said object lens driving unit is mounted on one of two opposite surfaces of said movable base member and said light beam generating and detecting unit is mounted on the other of said opposite surfaces of said movable base member.

2. An optical head device according to claim 1, wherein said movable base member is provided with first and second mounting stages separated by a step portion therebetween, and said object lens driving unit is mounted on an upper surface of said first mounting stage and said light beam generating and detecting unit is mounted on an under surface of said second mounting stage so as to be positioned laterally to said object lens driving unit.

3. An optical head device according to claim 2 further comprising mirror means provided on said movable base member for reflecting the light beam emerging from said collimating lens means contained in said light beam generating and detecting means toward the object lens means supported by said object lens driving means through an opening provided on said movable base member.

4. An optical head device for use in a disc player comprising:
   a light beam generating and detecting unit containing light beam generating means, collimating lens means, photodetecting means and beam splitting means, said beam splitting means leading a light beam generated by said light beam generating means to said collimating lens means and guiding a light beam coming through said collimating lens means from the outside onto said photodetecting means,
   an object lens driving unit for supporting object lens means to be movable and moving said object lens means in both a first direction along an optical axis of said object lens means and a second direction substantially perpendicular to said first direction; and
   a movable base member for supporting said light beam generating and detecting unit and said object lens driving unit both mounted thereon so that the light beam emerging from said collimating lens means contained in said light beam generating and detecting unit is incident through a predetermined path upon the object lens supported by said object lens driving unit,
   wherein said light beam generating and detecting unit comprises mount-housing means formed in a body to which said light beam generating means, collimating lens means, photodetecting means and beam splitting means are mounted, and cover means for covering a mounting opening provided on one of side portions of said mount-housing means, and
   wherein said cover means is provided with a plurality of engaging portions each projecting into the inside of said mount-housing ;means for positioning at least one of said light beam generating means, collimating lens means, photodetecting means and beam splitting means in said mount-housing means.

5. An optical head device for use in a disc player comprising:
   a light beam generating and detecting unit module containing light beam generating means, collimating lens means, photodetecting means and beam splitting means, said beam splitting means leading a light beam generated by said light beam generating means to said collimating lens means and guiding a light beam coming through said collimating lens means from the outside onto said photodetecting means,
   an object lens driving unit module for supporting object lens means to be movable and moving said object lens means in both a first direction along an optical axis of said object lens means and a second direction substantially perpendicular to said first direction;

a movable base member for supporting said light beam generating and detecting unit module and said object lens driving unit module, and means for mounting both said modules separately on said movable base member so that the light beam emerging from said collimating lens means contained in said light beam generating and detecting unit is incident through a predetermined path upon the object lens supported by said object lens driving unit.

6. An optical head device according to claim 5, wherein said light beam generating and detecting unit is arranged to be capable of being mounted on said movable base member.

7. An optical head device according to claim 5, wherein said light beam generating and detecting unit comprises mount-housing means formed in a body to which said light beam generating means, collimating lens means, photodetecting means and beam splitting means are mounted, and cover means for covering a mounting opening provided on one of side portions of said mount-housing means.

8. An optical head device according to claim 5, wherein said object lens driving unit comprises base plate means mounted on said movable base member, biaxial driving means provided on said base plate means for holding the object lens means and moving the object lens means held thereby in said first ad second directions, and case means for covering said biaxial driving means on said base plate means.

9. An optical head device according to claim 8, wherein said biaxial driving means in said object lens driving unit comprises a bobbin member for holding the object lens means and driving coil means disposed in relation to the object lens means, a movable member for supporting said bobbin member to cause the same to be movable in at least two different directions, and magnetic field forming means for generating a magnetic field working on said driving coil means.

* * * * *